(12) United States Patent
Fleischmann et al.

(10) Patent No.: US 8,079,458 B2
(45) Date of Patent: Dec. 20, 2011

(54) DEVICE FOR SPREADING OBJECTS APART

(75) Inventors: Bernd Fleischmann, Regensburg (DE); Martin Seger, Neumarkt (DE); Emil Dirmeier, Wolkering (DE); Johann Reil, Wald (DE)

(73) Assignee: Krones AG, Neutraubling (DE)

( * ) Notice: Subject to any disclaimer, the term of this patent is extended or adjusted under 35 U.S.C. 154(b) by 370 days.

(21) Appl. No.: 12/279,477

(22) PCT Filed: Jan. 16, 2007

(86) PCT No.: PCT/EP2007/000306
§ 371 (c)(1),
(2), (4) Date: May 13, 2009

(87) PCT Pub. No.: WO2007/093253
PCT Pub. Date: Aug. 23, 2007

(65) Prior Publication Data
US 2010/0000841 A1    Jan. 7, 2010

(30) Foreign Application Priority Data

Feb. 15, 2006   (DE) .................... 20 2006 002 351 U

(51) Int. Cl.
*B65G 47/26* (2006.01)
(52) U.S. Cl. ..................... 198/442; 198/461.1
(58) Field of Classification Search .............. 198/460.3, 198/461.1, 462.1, 462.3, 436, 442, 622
See application file for complete search history.

(56) References Cited

U.S. PATENT DOCUMENTS

| | | | | |
|---|---|---|---|---|
| 4,129,207 A | * | 12/1978 | Cupp | 198/462.3 |
| 4,756,400 A | * | 7/1988 | Funo et al. | 198/461.1 |
| 5,174,430 A | * | 12/1992 | Ebira | 198/418.5 |
| 5,186,306 A | * | 2/1993 | Sjostrand | 198/442 |
| 5,944,165 A | * | 8/1999 | Mannlein et al. | 198/442 |

FOREIGN PATENT DOCUMENTS

| | | |
|---|---|---|
| DE | 3122733 A1 | 3/1982 |
| DE | 3923549 A1 | 2/1990 |
| DE | 101 32 531 A1 | 1/2003 |
| EP | 873 951 B1 | 2/1998 |
| FR | 2804419 | 8/2001 |

OTHER PUBLICATIONS

Written Opinion for PCT/EP2007/000306 dated Sep. 18, 2008.

* cited by examiner

*Primary Examiner* — James R Bidwell
(74) *Attorney, Agent, or Firm* — Marshall, Gerstein & Borun LLP

(57) ABSTRACT

Device for spreading apart a single-file stream of upright containers, with a single-track feed conveyor, a multi-track discharge conveyor, and a transfer station, which comprises two oppositely driven belts, which form a transport channel for the containers and which can be driven at essentially the same transport velocity as the feed conveyor, where the transport channel formed by the belts is straight and releases the containers with excess velocity onto the discharge conveyor, which can be driven at a slower transport velocity than the feed conveyor.

6 Claims, 2 Drawing Sheets

DEVICE FOR SPREADING OBJECTS APART

CROSS-REFERENCE TO RELATED APPLICATION

The present application claims the benefit of priority of International Patent Application No. PCT/EP2007/000306, filed on Jan. 16, 2007, which application claims priority of German Patent Application No. 20 2006 002351.8, filed Feb. 15, 2006. The entire text of the priority application is incorporated herein by reference in its entirety.

FIELD OF THE DISCLOSURE

The disclosure pertains to a device for spreading containers away from each other, such as used with conveyors.

BACKGROUND

A device of this type is already known, in which the transport channel formed by two belts has a serpentine shape, which moves as a whole in the transport direction. (EP 873 951 B1). In this known device, the containers are offset laterally as they enter the transfer station. They pass through the transfer station unchanged and are then deposited in an offset manner onto the discharge conveyor. The area in which this known device is used is limited essentially to containers with a basically cylindrical shape. The production costs are also high because of the belts, which must be actuated by special cams of various shapes.

In another known device for spreading containers apart, the containers are pushed by a single-track feed conveyor between the expanding, funnel-like guide railings of a multi-track discharge conveyor (DE 101 32 531 A1). To increase the back-pressure, two oppositely driven belts, which can be operated at variable speed, are located exclusively in the area of the feed conveyor. This known device is also limited essentially to cylindrical objects and has a very complicated design.

SUMMARY OF THE DISCLOSURE

The disclosure is based on the task of creating a device for spreading apart a single-file stream of upright containers, namely, a device which has a wide area of application and which can be produced a low cost.

BRIEF DESCRIPTION OF THE DRAWINGS

An exemplary embodiment of the disclosure is described below on the basis of the drawings.

DETAILED DESCRIPTION

Figure 1:
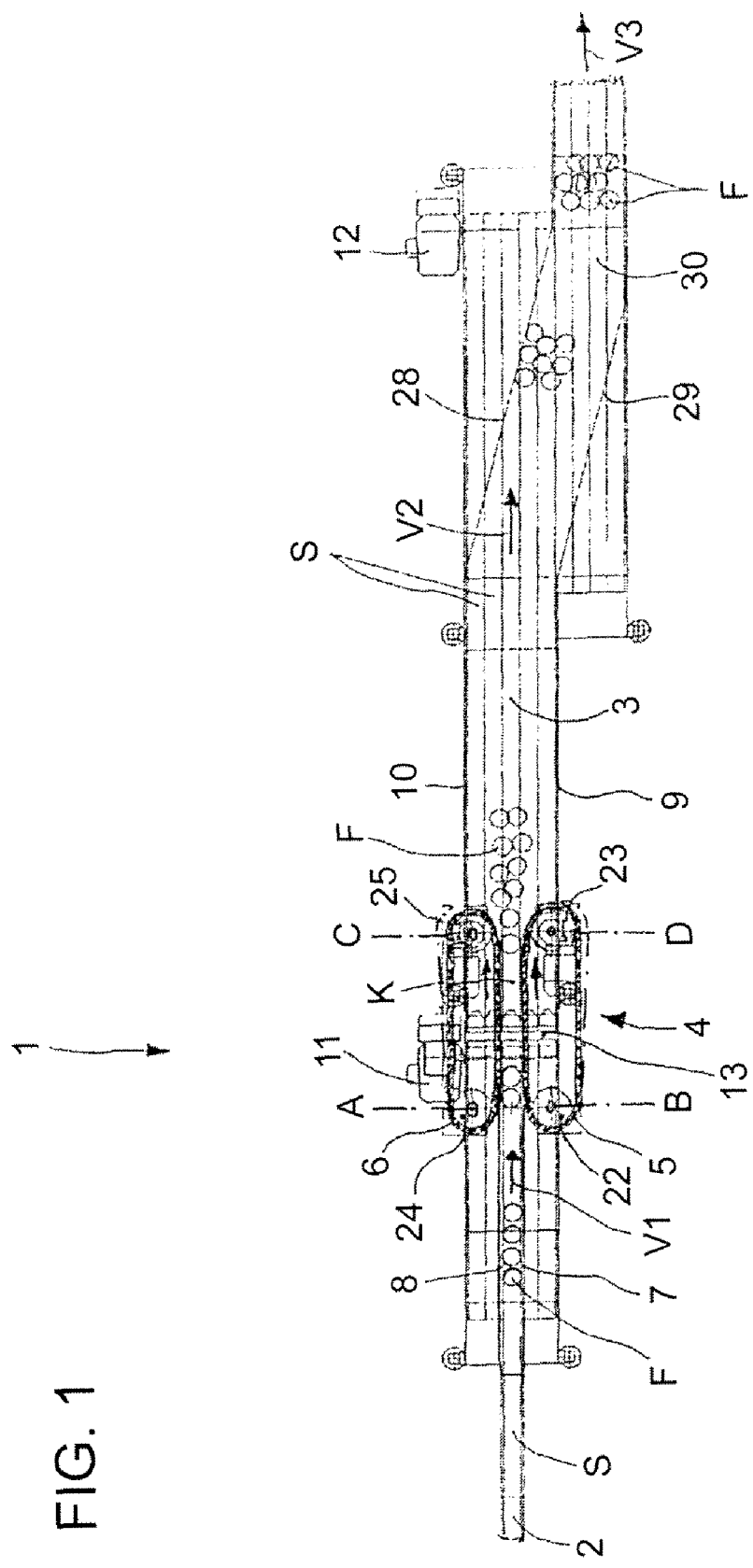
FIG. 1 shows a top view of a device for spreading containers apart.
Figure 2:
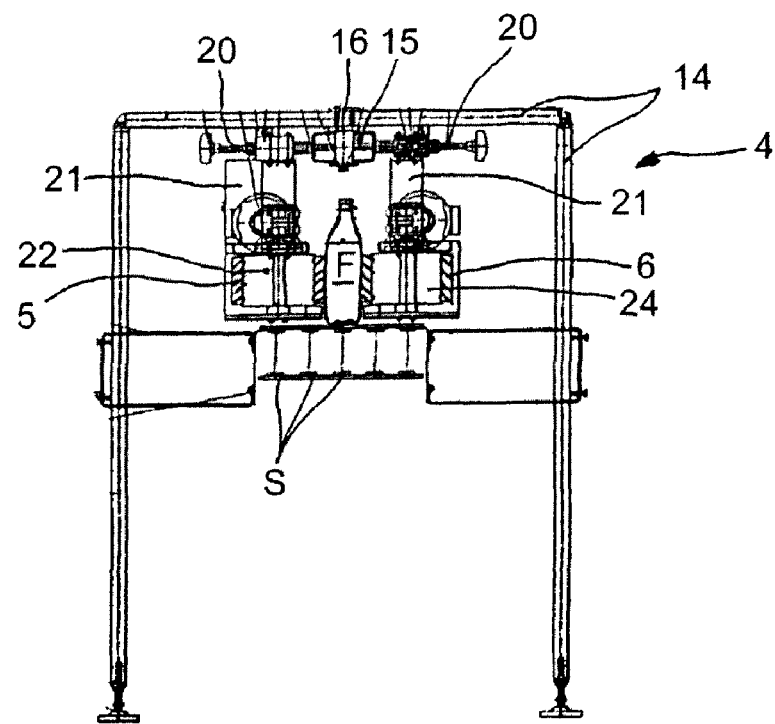
FIG. 2 shows a cross section along line AB of FIG. 1.
Figure 3:
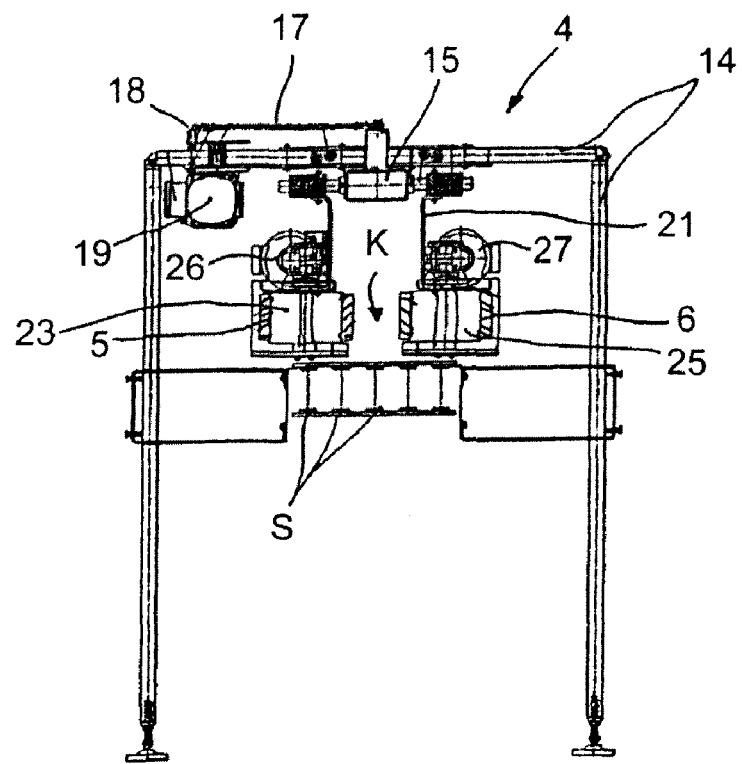
FIG. 3 shows a cross section along line CD of FIG. 1.

The device 1 according to FIGS. 1-3 is set up to spread apart a stream of upright containers in the form of bottles F being conveyed in single file. It has a single-track feed conveyor 2 with lateral guide railings 7, 8 and, in alignment with the feed conveyor, an adjoining multi-track discharge conveyor 3 with two lateral guide railings 9, 10. The feed and discharge conveyors 2, 3 have endless flat-top chains S, which form a continuous, horizontal transport surface. This surface is smooth and flat and is provided with a lubricant by nozzles (not shown) to make it possible for the bottles F to slide and to push each other.

The flat-top chain S of the feed conveyor 2 is driven by a drive motor 11 at a velocity V1, whereas the flat-top chain S of the discharge conveyor 3 is driven by a drive motor 12 at a slower velocity V2. In the transition area between the feed conveyor 2 and the discharge conveyor 3, the gap between the flat-top chains S is covered by a horizontal slide-over plate 13.

In the transition area between the feed conveyor 2 and the discharge conveyor 3, furthermore, a transfer station 4 is also provided, which extends across both of the conveyors. The transfer station 4 has a stand 14, formed out of several vertical columns and horizontal struts. On the bottom side of the horizontal struts, a straight, horizontal sectional beam 15 is installed, which, at the end pointing toward the feed conveyor, is supported so that it can pivot on a bearing bolt 16 around a vertical axis, which is centered with respect to the feed conveyor 2. One end of a pushrod 17 is linked to the end of the sectional beam 15 pointing toward the discharge conveyor 3, while the other end of the pushrod is attached in an articulated manner to a crank 18. The crank 18, as needed, can be driven continuously by a drive motor 19 mounted on the stand 14, as a result of which the sectional beam 15 oscillates back and forth with respect to a central position in which it is parallel to the transport direction at a speed which is described by a more-or-less sinusoidal curve.

Two retaining brackets 21, each of which has a threaded spindle 20 by which its position can be adjusted, are attached to each side of the sectional beam 15. Return pulleys 22-25 with a vertical axis of rotation are mounted on these brackets. Endless conveyor belts 5, 6 with elastic surfaces are guided around the return pulleys. These surfaces form a single-file transport channel K for the bottles F adjoining the feed conveyor 2. By means of the threaded spindles 20, the retaining brackets 21 and thus the conveyor belts 5, 6 can be adjusted symmetrically to the center of the feed conveyor 2 and adapted to bottles of various diameters. The conveyor belts 5, 6 are adjusted so that they rest with slight pressure against the bottles F and thus carry them along by frictional contact. The conveyor belts 5, 6 can be designed, for example, as toothed belts or as V-belts with an elastic covering.

A separate drive motor 26, 27 is provided for each conveyor belt 5, 6. Each motor is mounted on a retaining bracket 21 and acts on a return pulley 23, 25. The drive motors 26, 27 drive the two conveyor belts 5, 6 synchronously in opposite directions at a circumferential velocity equal to velocity V1. The transport velocity in the transport channel K is therefore the same as the transport velocity V1 of the feed conveyor 2.

As the bottles F are being supplied by the feed conveyor 2, they are in contact with each other or are separated from each other by only a short distance. They are introduced into the transfer station 4, and, because of the straight configuration of the transport channel K, they pass through the transport channel K without any change in transport velocity or in the distance between adjacent bottles. For this purpose, it is necessary only to have belts with coverings of the same thickness, and bottles F of any shape can be transported.

As the bottles F are passing through the transport channel K, they are transferred via the slide-over plate 13 to the slower-running discharge conveyor 3, but they still maintain their velocity V1 as long as they are still held between the conveyor belts 5, 6. After leaving the belts, the bottles F slide a certain additional distance along the smooth, flat, lubricated surface of the flat-top chain S of the discharge conveyor 3, until they are braked by friction to velocity V2 of the discharge conveyor. The slower transport velocity V2 necessarily results in a sideways jostling or spreading-apart of the bottles F. This velocity therefore determines the degree to which the bottles spread apart and/or the number of tracks on the discharge conveyor 3 and is dependent on the stability of the bottles F.

The bottles F are transferred to a collecting conveyor 30, laterally adjacent to the discharge conveyor, by means of additional guide railings 28, 29 extending at an angle to the transport direction. The collecting conveyor is driven at an even slower transport velocity V3. A dense, multi-track stream of bottles forms on it.

The previously described function of the device 1 makes it possible to spread out a stream of essentially rotationally symmetric bottles F at outputs of up to approximately 80,000 bottles/hour. For the processing of bottles with a polygonal cross section, it can be advisable to impose a slight oscillating motion on the guide channel K, which can be done by turning on the motor 19. In this way, the bottles F are already slightly offset from each other as they leave the transport channel K, which facilitates the subsequent braking and lateral displacement on the slower-running discharge conveyor 3.

The invention claimed is:

1. Device (1) for spreading out a single-file stream of upright containers (F), comprising a single-track feed conveyor (2), a multi-track discharge conveyor (3), a transfer station (4) having two oppositely driven belts (5, 6) which form a transport channel (K) for the containers and which are driven essentially at the same transport velocity as the feed conveyor, and the transport channel (K) formed by the belts (5, 6) extends in a straight line and releases the containers (F) with excess velocity onto the discharge conveyor (3), the discharge conveyor (3) being drivable at a slower transport velocity than the feed conveyor (2), wherein the transport channel (K) is stationary.

2. Device according to claim 1, wherein the transport channel (K) can pivot around a vertical axis in its inlet area.

3. Device according to claim 1, wherein the transfer station (4) has a longitudinal beam (15) mounted above the transport route, and return pulleys (22-25) for the belts (5, 6) rotatably supported on the beam (13).

4. Device according to claim 3, wherein the return pulleys (22-25) are adjustable in the direction transverse to the longitudinal direction of the longitudinal beam (15).

5. Device according to claim 3, and at least one drive motor (26, 27) for the belts (5, 6) is mounted on the longitudinal beam (15).

6. Device according to claim 4, wherein the longitudinal beam (15) is supported so that it can pivot around a vertical axis and is connected to a pivoting drive (17-19).

* * * * *